United States Patent
Deutsch

(10) Patent No.: US 6,842,236 B1
(45) Date of Patent: Jan. 11, 2005

(54) METHOD AND DEVICE FOR CONTINUOUSLY MONITORING AN OPTICAL TRANSMISSION PATH

(75) Inventor: Bernhard A. M. Deutsch, Hickory, NC (US)

(73) Assignee: Corning Incorporated, Corning, NY (US)

( * ) Notice: Subject to any disclaimer, the term of this patent is extended or adjusted under 35 U.S.C. 154(b) by 177 days.

(21) Appl. No.: 10/110,520

(22) PCT Filed: Oct. 13, 2000

(86) PCT No.: PCT/DE00/03618
§ 371 (c)(1),
(2), (4) Date: Apr. 11, 2002

(87) PCT Pub. No.: WO01/28133
PCT Pub. Date: Apr. 19, 2001

(30) Foreign Application Priority Data

Oct. 13, 1999 (DE) .......................... 199 49 401

(51) Int. Cl.[7] .............................................. G01N 21/88
(52) U.S. Cl. ......................................................... 356/73
(58) Field of Search ....................... 356/73.1; 598/9–38, 598/140–172

(56) References Cited

U.S. PATENT DOCUMENTS

| 5,790,285 A | | 8/1998 | Mock | |
|---|---|---|---|---|
| 6,046,797 A | * | 4/2000 | Spencer et al. | 356/73.1 |
| 6,385,203 B2 | * | 5/2002 | McHale et al. | 370/401 |
| 6,633,642 B1 | * | 10/2003 | Oakley | 379/405 |

FOREIGN PATENT DOCUMENTS

| DE | 298 19 353 | 10/1999 |
|---|---|---|
| EP | 0 841 552 | 5/1998 |

* cited by examiner

Primary Examiner—Tu T. Nguyen
(74) Attorney, Agent, or Firm—Walter M. Douglas

(57) ABSTRACT

The main steps of the invention comprise feeding a sample signal ($S_{OTDR}$) into the transmission line or path (2) using a multiplexer (8) during a current signal transmission and measuring the intensity of said sample signal ($S_{OTDR}$), which is also coupled out via the multiplexer (80 and is reflected partially at faulty or error points. Part of the signal to be transmitted ($S_{in}$) can also be deviated by means of a coupling device (4) and the intensity of this proportion of the signal ($S_{up}$) can be compared with a threshold value. By evaluating the intensities that are measured, it is possible to detect and localize defects in the transmission path (2) or judge the quality of the transmission path (2 without interrupting the transmission.

19 Claims, 3 Drawing Sheets

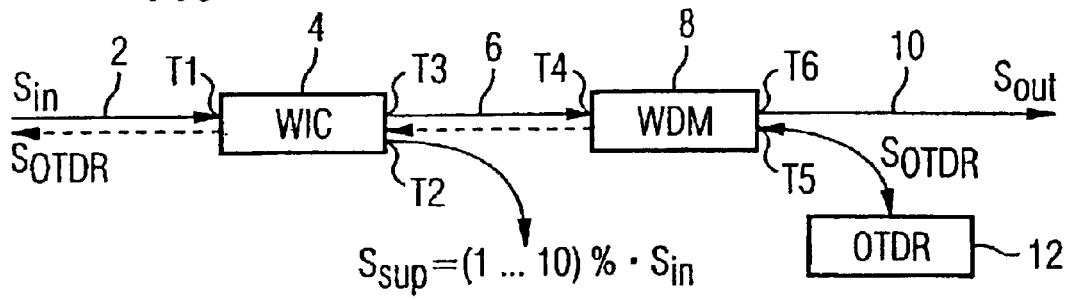
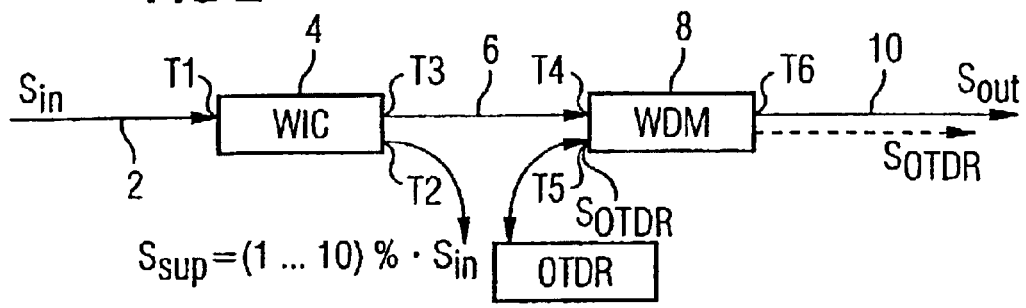
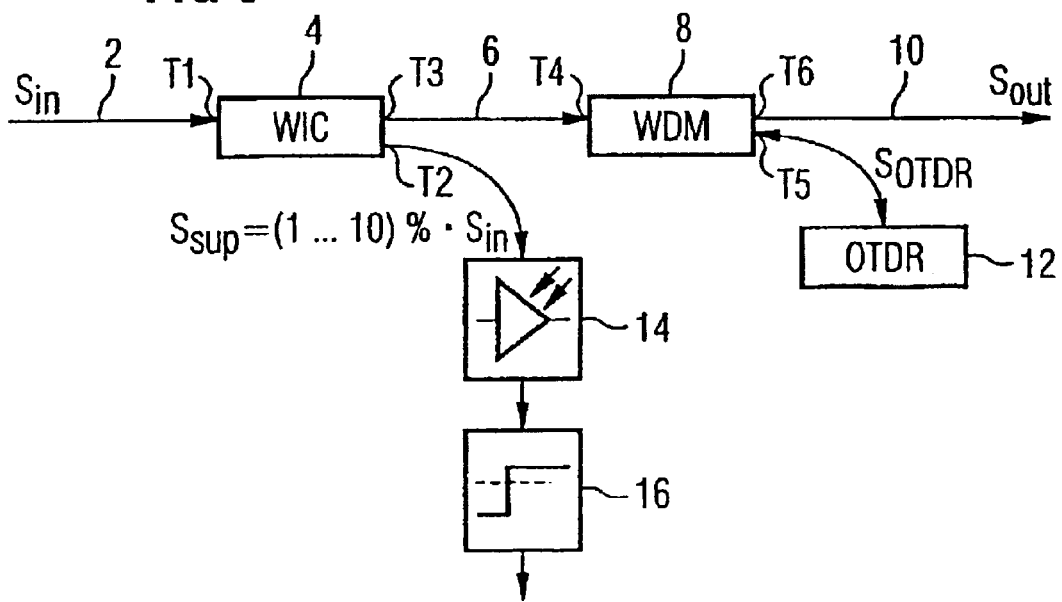

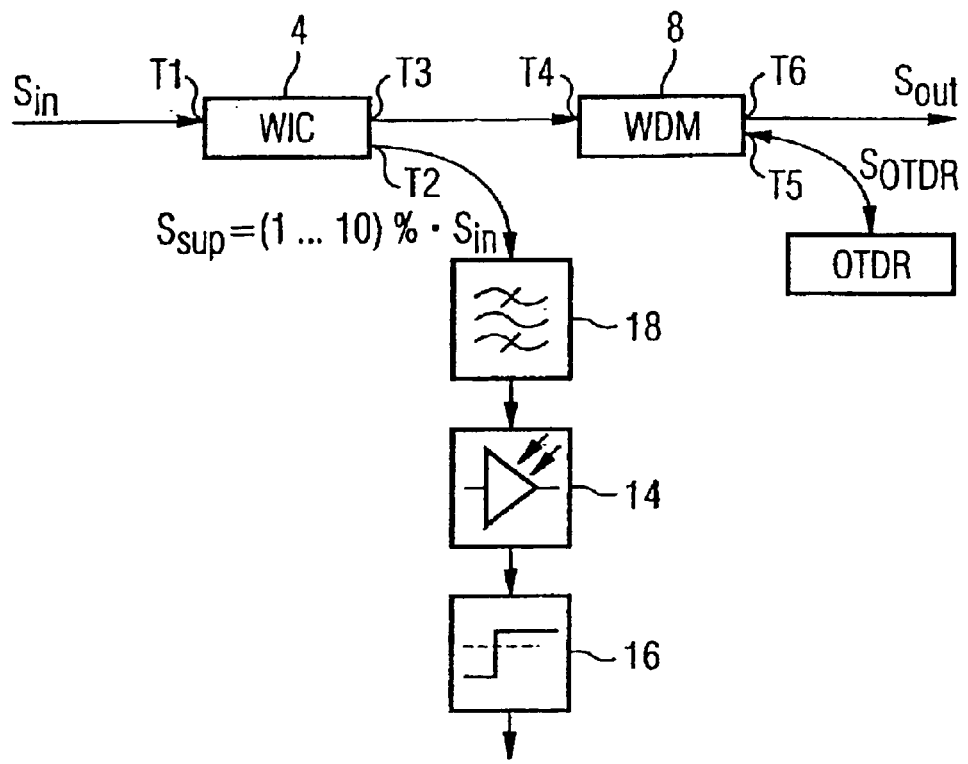
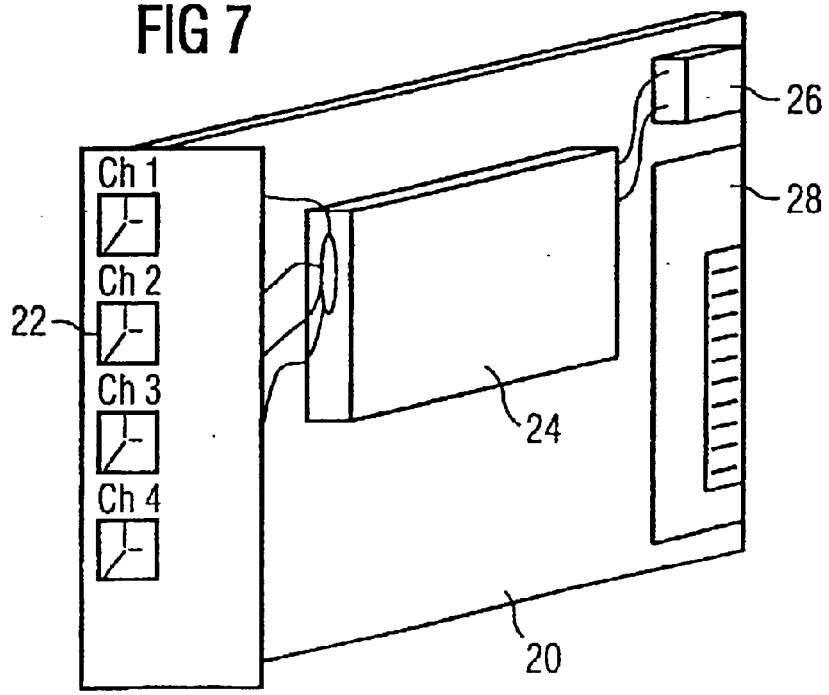

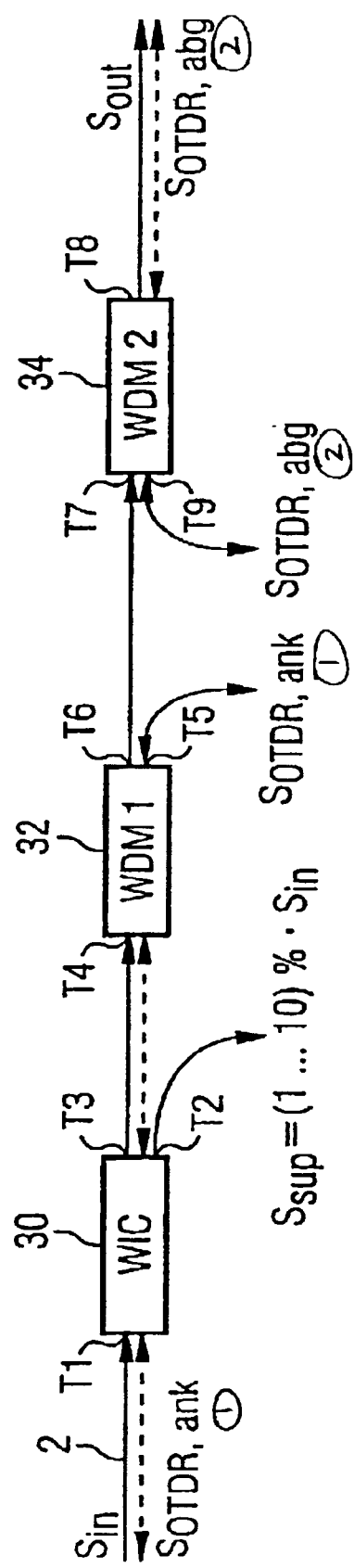
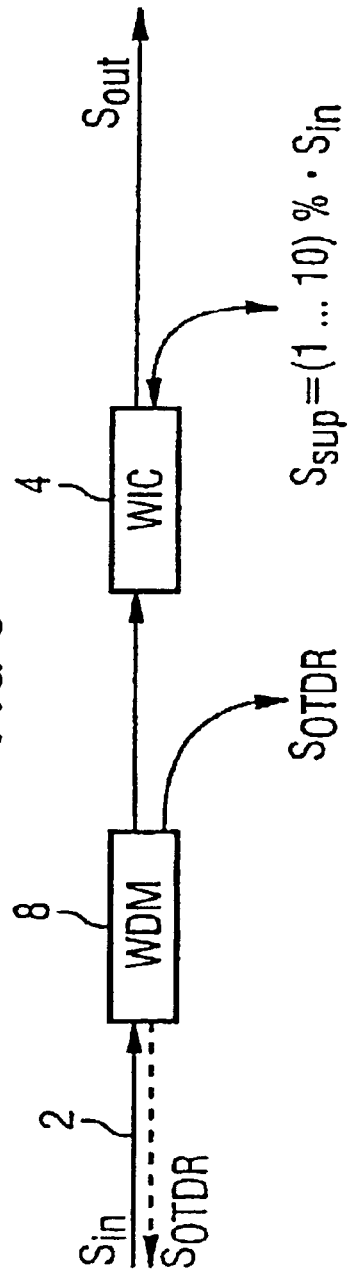

METHOD AND DEVICE FOR CONTINUOUSLY MONITORING AN OPTICAL TRANSMISSION PATH

CROSS-REFERENCE TO RELATED APPLICATIONS

This application claims the benefit of priority under 35 U.S.C. § 119 of German Patent Application No. 19949401, filed Oct. 13, 1999, and is a national stage filing, under 35 U.S.C. § 371 of PCT Application PCT/DE00/03618, filed Oct. 13, 2000.

FIELD OF THE INVENTION

The invention is directed to a method and device for continuous monitoring an optical transmission path or line.

BACKGROUND OF THE INVENTION

Data traffic on optical transmission lines is constantly increasing owing to the increase in the channel-bit width in time multiplex and the number of channels in wavelength multiplex. Because of the increased load on transmission lines, errors are being increasingly noticed in the transmission line and lead to transmission errors. A demand therefore exists for effective methods and devices to monitor optical transmission lines.

At the present time, when there are problems on a transmission line, the transmission lines are generally briefly interrupted in order to be able to connect corresponding measurement devices by which a transmission signal can be coupled into the transmission line in order to test the transmission line. A fraction of the transmitted signal can also be coupled out of line in order to test the transmission line. Continuous or at least uninterrupted coupling is not possible here.

A monitoring system already exists, available from the CIENA Corporation under the name WaveWatcher®, which permits continuous monitoring of an optical network. However, this is a relatively costly system with a network element manager, an optical service channel and an element management system embedded in an optical network. The system monitors, measures and stores the status and operation method of each module in the system. A standard data communications network is used, which is supported by the optical service channel, in order to process management information about the system. The data communications network permits remote access and remote control of network management elements. The drawback of this system is that it is relatively costly.

A system for monitoring optical networks is also available from Lucent Technologies, which is used to supervise the configuration, performance, reliability and other parameters of an optical network at the network management level. This system determines the components that are involved when an error occurs in the network. The operator can then decide what should be done with these components, and he can inform the user of these circuits. This system is also relatively expensive.

As a result, the underlying objective of the present invention is to provide continuous monitoring of an optical transmission line or an optical network by the simplest possible means.

SUMMARY OF THE INVENTION

In one aspect of the invention, a method for monitoring of an optical transmission line is provided in which a test signal is coupled into the monitored transmission line without interruption of the monitored line. The test signal reflected by the transmission line is coupled out without interruption of the monitored line, the frequency of the test signal is chosen to be outside of the transmission band of the transmitted signal, and an assessment of the quality of the transmission line, or an error in the transmission line, is made by measurement of the reflected test signal. Since no interruption of the transmitted signal is required for coupling in or coupling out of the test signal, a continuous and uninterrupted monitoring of the optical transmission line can be easily be carried out with the invention.

One embodiment of the method according to the invention is that the test signal is an OTDR signal. OTDR (optical time domain reflectometer) is a system used to determine the quality of transmission lines or errors in a transmission line, in which the signals reflected by the transmission line are measured. In the event of an error, location resolution can be achieved by means of reflected signals, which means assessments concerning the location and type of error can be made via the propagation time of the test signal from the coupling to the reflection site and back out of the coupling and via the intensity of the reflected signal.

The aforementioned objective is further realized by a method for monitoring of optical transmission lines, in which a fraction of a transmitted or incoming signal ($S_{IN}$) is coupled out without interruption of the monitored line, and that an assessment of the quality of the transmission line, or an error in the transmission line, is made by measurement of the coupled out signal ($S_{SUP}$). In this method; continuous and uninterrupted monitoring of the optical transmission line is possible, in which the transmitted signal itself, that is, a fraction of it, is directly used to measure the quality of the transmission line.

It is advantageous if the method just mentioned is applied in combination with the first-named method because assessments can then be made about the quality of the transmission line or errors in the transmission line, such as an increasing drop in transmission power or a threatening failure of the transmission line, from both measured quantities, namely, the reflected signal of the test signal and the coupled out fraction of the transmitted signal. Measurement of the transmitted signal gives a direct indication of the interaction between the transmission line and the transmitted signal, whereas evaluation of the test signal permits location resolution; that is, localization of the error, in the event of an error.

A further embodiment of the method according to the invention is that the transmission signal ($S_{SUP}$), i.e., the coupled out fraction of the transmitted signal ($S_{IN}$), is filtered before measurement: so that only signals lying in the transmission band of the transmitted signal ($S_{IN}$) are passed through. Undesired signal fractions and, in the event of a test signal, their inclusion in the measurement of the transmitted signal, are therefore avoided so that exact measurement of the interaction of the transmission line with the transmitted signal can occur. In addition, the saturation or destruction/damage to the receiver by the OTDR signal is avoided, which is known to have a high output power.

Another embodiment of the method according to the invention is that the measurement result is processed according to a logic, and that an alarm is issued when an error is found. Processing of the measurement result valuable to the user occurs because it enable the user can react accordingly.

Another embodiment of the method according to the invention is characterized by the fact that the intensity of the coupled out signal lies at 1–10% of the intensity of the transmitted signal. The total power of the transmitted signal that is further transmitted during execution of the method according to the invention is therefore advantageously only slightly reduced.

Finally, another embodiment of the method according to the invention is that the test signal is coupled into the transmission line of the incoming and/or outgoing transmitted signal. Monitoring of the transmission line can therefore be carried out both opposite the direction of the transmitted signal and in the direction of the transmitted signal. When both monitoring capabilities are exploited, a cost savings is produced from the fact that the modules for execution of the method according to the invention need only be inserted after every other transmission line unit is supervised.

To realize the aforementioned objective, a device for the monitoring of optical transmission lines according to the invention is characterized by a multiplexer, via which a test signal ($S_{OTDR}$), whose frequency lies outside of the transmission band of the transmitted signal, is coupled into the transmission line without interruption of the monitored line, or a reflected signal is coupled out from the line, and by a coupler, with which the reflected signal is coupled out from the transmission line without interruption of the monitored line, in which, an assessment is made concerning the quality of the transmission line or an error in the transmission line by use of the measurement of the reflected test signal. For implementation of a module for execution of the method according to the invention, only a multiplexer and a coupler are therefore required, and the transmission line can be continuously monitored without interruption.

An additional embodiment of the device according to the invention is characterized by the fact that an OTD reflectometer is connected downline of the coupler. With this arrangement, a conclusion can be made from the reflected test signal concerning the location of an error site in the transmission line.

Another device to realize the aforementioned objective is characterized by the use of a coupling device through which a fraction of a transmitted or incoming signal ($S_{IN}$) is coupled out as monitoring signal ($S_{SUP}$), a measurement device to measure the coupled out signal ($S_{SUP}$), and a device through which an assessment is made concerning the quality of the transmission line or an error in the transmission line based on the measured signal. Here, only one coupling device and one measurement device are advantageously required in order to perform the measurements that are necessary for continuous and uninterrupted monitoring of the transmission line.

A major advantage of the device according to the invention lies in the optimal combination of the components WIC (wavelength independent coupler) and WDM (wavelength division multiplexer) in one module that supplies the required function. The module need only be inserted in an existing transmission system.

An advantageous embodiment of the device is that the multiplexer is a WDM. In such a multiplexer, it is advantageous that signals of any frequencies, that even signals with frequencies outside of the transmission band of the transmitted signal, can be coupled into the transmission line.

An advantageous embodiment of the device according to the invention is that the measurement device is a photodetector that measures the power of the coupled out transmitted signal.

An advantageous embodiment of the device according to the invention is that the device for evaluation of the measured, coupled out transmitted signal is a logic circuit with an alarm function.

Another advantageous embodiment of the device according to the invention is that the coupling device is a so-called WIC device, so that the module can be used over a wide frequency range of transmitted signals.

Another advantageous embodiment of the device according to the invention is that an optical bandpass filter is provided between the coupling device and the measurement device in order to filter out signal fractions that are not supposed to be measured in the measurement device. Especially, when a test signal is used in addition to the transmitted signal, the test signal must be filtered out in order to permit precise measurement of the transmitted signal. Saturation or destruction or damage to the receiver by the OTDR signal is also avoided, which is known to have high output power.

Another advantageous embodiment of the device according to the invention is that two wavelength multiplexers are provided. One wavelength multiplexer couples the test signal for the incoming part of the transmission line, and the other wavelength multiplexer couples the test signal ($S_{OTDR,out}$) for the outgoing part of the transmission line. Both parts of the transmission line can thus be advantageously monitored by one module.

Another advantageous embodiment of the device according to the invention is that the multiplexer is arranged in the transmission direction in front of the coupler, in which filtering of the OTDR signal can be dispensed with. Finally, an additional advantageous embodiment of the device according to the invention is that the devices that form a module for monitoring optical transmission lines are arranged on a printed circuit or on a plug-in unit. In this manner, the module can be integrated in existing hardware without additional means.

BRIEF DESCRIPTION OF THE DRAWINGS

Examples of the invention are now described with reference to the accompanying drawings. In the drawings:

FIG. 1 illustrates the layout of a module for supervision of optical transmission lines when the incoming branch of a transmission line is to be supervised;

FIG. 2 illustrates the layout of a module for supervision of optical transmission lines when the outgoing branch of a transmission line is to be supervised;

FIG. 3 illustrates the layout of a module, as in FIG. 1, with the addition of a photodetector and a logic circuit to generate an alarm signal;

FIG. 4 illustrates the layout of a module, as in FIG. 1, with the addition of a photodetector and a logic circuit to generate an alarm signal with an additional optical filter;

FIG. 5 illustrates the layout of a module, when the OTDR signal is coupled into both the incoming and outgoing transmission lines;

FIG. 6 illustrates the layout of a module for supervision of optical transmission lines as an alternative to FIG. 1; and FIG. 7 illustrates a plug-in unit with a module according to the invention.

DETAILED DESCRIPTION OF THE INVENTION

FIG. 1 shows a module for monitoring of optical transmission lines, especially a transmission line 2 for an incoming signal $S_{IN}$. The incoming signal $S_{IN}$ is fed to the gate T1

(the input signal arm) of a wavelength-independent coupler 4 (WIC=wavelength-independent coupler), which couples out a fraction of the incoming signal $S_{IN}$ at gate T2 (the tap arm), while the remaining main part of the incoming signal SIN is coupled out at gate T3 (the signal out arm). The power fraction of the incoming signal SN coupled out at gate T2 lies in the range from 1 to 10% of the signal $S_{IN}$ coupled in at gate T1. The main fraction of the incoming signal $S_{IN}$ is released via a transmission line 6 to a first wavelength multiplexer 8 (WDM=wavelength division multiplexer). The multiplexer 8 receives the signal at gate T4 (the common arm). An OTDR signal $S_{OTDR}$ is coupled in at gate T5 (the test signal arm) of the wavelength division multiplexer 8 into the signal transmission line or coupled out from it. At a gate T6 (the communication signal out arm), the output signal $S_{out}$ from the module is coupled out and released via a transmission line 10. The signal $S_{OTDR}$ is evaluated in an OTD refractometer 12. The wavelength of signal $S_{OTDR}$ lies outside the transmission band of the transmitted signal. If the signal is transmitted in the third optical window (at about 1550 nm), the signal $S_{OTDR}$ can lie at 1310 nm or above 1600 nm (typically at 1625 nm). If it is transmitted in the second optical window, the signal $S_{OTDR}$ lies in the wavelength range above 1550 nm or at 1625 nm.

FIG. 2 shows the essential layout of a module for monitoring of the outgoing branch of the transmission line. The same reference numbers are used in FIG. 2 for the same parts as shown in FIG. 1. By reversing the wavelength multiplexer 8, a situation is achieved in which a signal $S_{OTDR}$ coupled in at gate T5 has a travel direction so that the outgoing branch of the transmission line or the transmission line 10 is supervised by signal $S_{OTDR}$. The behavior of the transmission line 10 with reference to the transmitted signal $S_{out}$ is then monitored in the next monitoring module in the transmission line, where a WIC is also provided, which then couples out part of the transmitted signal, permitting conclusions concerning the transmission characteristics of transmission line 10.

FIG. 3 shows the module of FIG. 1, in which a photodetector and a logic circuit 16 are added. The photodetector 14 receives the coupled out fraction $S_{SUP}$ of the transmitted signal $S_{IN}$ and sends a corresponding measured value to the logic circuit 16, which, for example, via a threshold value determination, indicates the quality of the transmission line or establishes an error in the transmission line and issues an electrical signal or alarm signal.

FIG. 4 is another advantageous embodiment of the module according to the invention, in which a bandpass filter 18 is provided in front of the photodetector 14, so that the back-scattered signal $S_{OTDR}$ does not fall on the photodetector 14 and distort the measurement there or over saturate or damage the detector.

The variants according to FIGS. 3 and 4 equally apply to the practical examples of FIGS. 1 and 2.

FIG. 5 shows the essential layout of a module when the OTDR signal is coupled into the incoming and outgoing transmission lines. For this purpose, a wavelength-dependent coupler 30, a first wavelength multiplexer 32 and a second wavelength multiplexer 34 are provided in the transmission line 2. As in the preceding practical examples, part of the signal $S_{IN}$ that arrives at gate T1 of coupler 30 is coupled out at gate 12 of the coupler 30 as supervision signal $S_{SUP}$.

The transmission signal is released from gate T3 of coupler 30 to gate T4 of the first wavelength multiplexer 32. At gate T5 of the wavelength multiplexer 32, the test or OTDR signal $S_{OTDR,in}$ is coupled in, which is supposed to supervise the incoming part of the supervision line. The transmitted signal is released at gate T6 of the wavelength multiplexer 32 and introduced at gate T7 to the second wavelength multiplexer 34. The transmitted signal is released at gate T8 of the wavelength multiplexer 34 as signal $S_{out}$. A test signal $S_{OTDR,out}$ is coupled in at gate T9, which is supposed to monitor the outgoing part of the transmission line. The coupler 30 and the wavelength multiplexer 32, 34 can again be assembled in one module.

FIG. 6 shows the essential layout of a module for the monitoring of an optical transmission line, in which the same components are used as in the practical example of FIG. 1. Departing from FIG. 1, however, the wavelength multiplexer 8 here is arranged in the transmission direction in front of coupler 4, which is shown by signals $S_{IN}$ and $S_{OS}$[sic]. The test signal $S_{OTDR}$ coupled into the wavelength multiplexer 8 serves to monitor the incoming part of the supervision line. This practical example of the invention has the additional advantage that filtering of the OTDR signal can be saved because this signal is coupled out before coupler 4 and therefore cannot reach the detector.

The entire module can be constructed from discrete individual components or be an optically-integrated component based on $SiO_2$, Si or InP technology. Overall damping of the signal between gate T1 and gate T6 is less than 3 dB.

FIG. 7 shows a plug-in unit with a circuit board 20, on which the monitor module 24, a panel with OWG couplings 22, especially couplings for channels 1 to 4, an output 26 for an electrical alarm or a power supply and a network interface 28 are included. The network interface is advantageous in that the computer capacity of the computer can be utilized via this plug-in unit, in which the plug-in unit is installed in order to perform evaluations of signals measured in the monitoring module (OWG=optical wave guide).

Although in the preceding description the monitor module is described so that it has a wavelength-independent coupler 4 or 30 in combination with one or more wavelength multiplexers 8 or 32, 34, it should be noted that the monitoring functions of these two components could be used separately.

What is claimed is:

1. A method for continuously monitoring an optical transmission line, said method comprising the steps of:

a extracting a faction of a transmitted or received signal $S_{IN}$ independently of wavelength without interrupting the line being monitored, introducing a test signal into the line being monitored without interrupting the line being monitored, and extracting the test signal reflected by the transmission line without interrupting the line being monitored;

wherein the frequency of the test signal is chosen to be outside the transmission band of the transmitted signal, and wherein information on the quality of the transmission line, or an error or defect in the transmission line, is obtained based on a measurement of the extracted signal fraction ($S_{SUP}$) as well as the reflected test signal.

2. The method according to claim 1, wherein the test signal $S_{OTDR}$ is an optical time domain reflectometer signal.

3. The method according to claim 2, wherein $S_{SUP}$, being an extracted fraction of the transmitted signal $S_{IN}$, is flittered before the measurement in such a way that only signals that lie in the transmission band of the transmitted signal $S_{IN}$ are allowed to pass.

4. The method according to claim 3, wherein the measuring result is logically processed and an alarm is triggered if an error or defect is detected.

5. The method according to claim 3, wherein the power of the extracted signal fraction $S_{SUP}$ is in the range of 1–10% of the power of the transmitted signal $S_{IN}$.

6. The method according to claim 5, wherein the test signal is introduced into the transmission line of the signal being received or of the signal being transmitted.

7. The method according to claim 1, wherein the $S_{UP}$, being an extracted fraction of the transmitted signal $S_{IN}$, is filtered before the measurement in such a way that only signals that lie in the transmission band of the transmitted signal $S_{IN}$ are allowed to pass.

8. The method according to claim 1, wherein the power of the extracted signal fraction ($S_{SUP}$) is in the range of 1–10% of the power of the transmitted signal $S_{IN}$.

9. The method according to claim 1, wherein the test signal is introduced in to the transmission line of the signal being received of the signal being transmitted.

10. A device for continuously monitoring an optical transmission line said device comprising:

a coupler having an arm for receiving an input signal from an optical transmission line, a tap arm for separating a faction of the input signal, and a signal output arm, and a first multiplexer having a common arm, a test signal arm for receiving a test signal from a test signal source, and a communications signal output arm, and said multiplexer being further capable of extracting a reflected signal from said transmission line;

wherein said coupler separated fraction of said input signal and said multiplexer extracted signal are sent to separate measuring and/or evaluating devices to obtain information regarding the quality of the transmission line and/or defects in the transmission line, and said coupler signal output arm and multiplexer common arm are connected to enable the passage of an optical signal between the two, and the test signal frequency is one which lies outside the frequencies being transmitted in said optical transmission line, and said all signals are coupled into or out of said mission without interrupting the signal passing through said transmission line.

11. The device according to according to claim 10, wherein the evaluating device for the signal extricated from the multiplexer is an optical time domain reflectometer.

12. The device according to claim 10, wherein the measuring device for the signal from the coupler is a photodetector.

13. The device according to claim 12, wherein a logic circuit with an alarm is connected to said photodetector to evaluate the measured signal transmitted therefrom.

14. The device according to claim 13, wherein a bandpass filter is arranged between the coupling device and the measuring device.

15. The device according to claim 12, wherein a bandpass filter is arranged between the coupler and the photodetector.

16. The device according to claim 10, wherein a bandpass filter is arranged between the coupler and a photodetector.

17. The device according to claim 10, wherein said device contain a second multiplexer in addition to said first multiplexer and said coupler, wherein one of said multiplexer couples a test signal into the incoming section of the optical transmission line, and the other wavelength multiplexer couples a test signal into the outgoing section of the optical transmission line.

18. The device according to claim 10, wherein, in the direction of optical transmission, the first multiplexer is arranged before the coupler.

19. The device according to claim 10, wherein the device is a module which can be mounted on a printed-circuit board or on a rack.

* * * * *

UNITED STATES PATENT AND TRADEMARK OFFICE
CERTIFICATE OF CORRECTION

PATENT NO. : 6,842,236 B1
DATED : January 11, 2005
INVENTOR(S) : Bernhard Deutsch It is certified that error appears in the above-identified patent and that said Letters Patent is hereby corrected as shown below:

<u>Column 8,</u>
Line 4, "mission" should read -- transmission --
Line 8, "extricated" should read -- extracted --

Signed and Sealed this

Third Day of May, 2005

JON W. DUDAS
*Director of the United States Patent and Trademark Office*